United States Patent Office 2,973,152
Patented Feb. 28, 1961

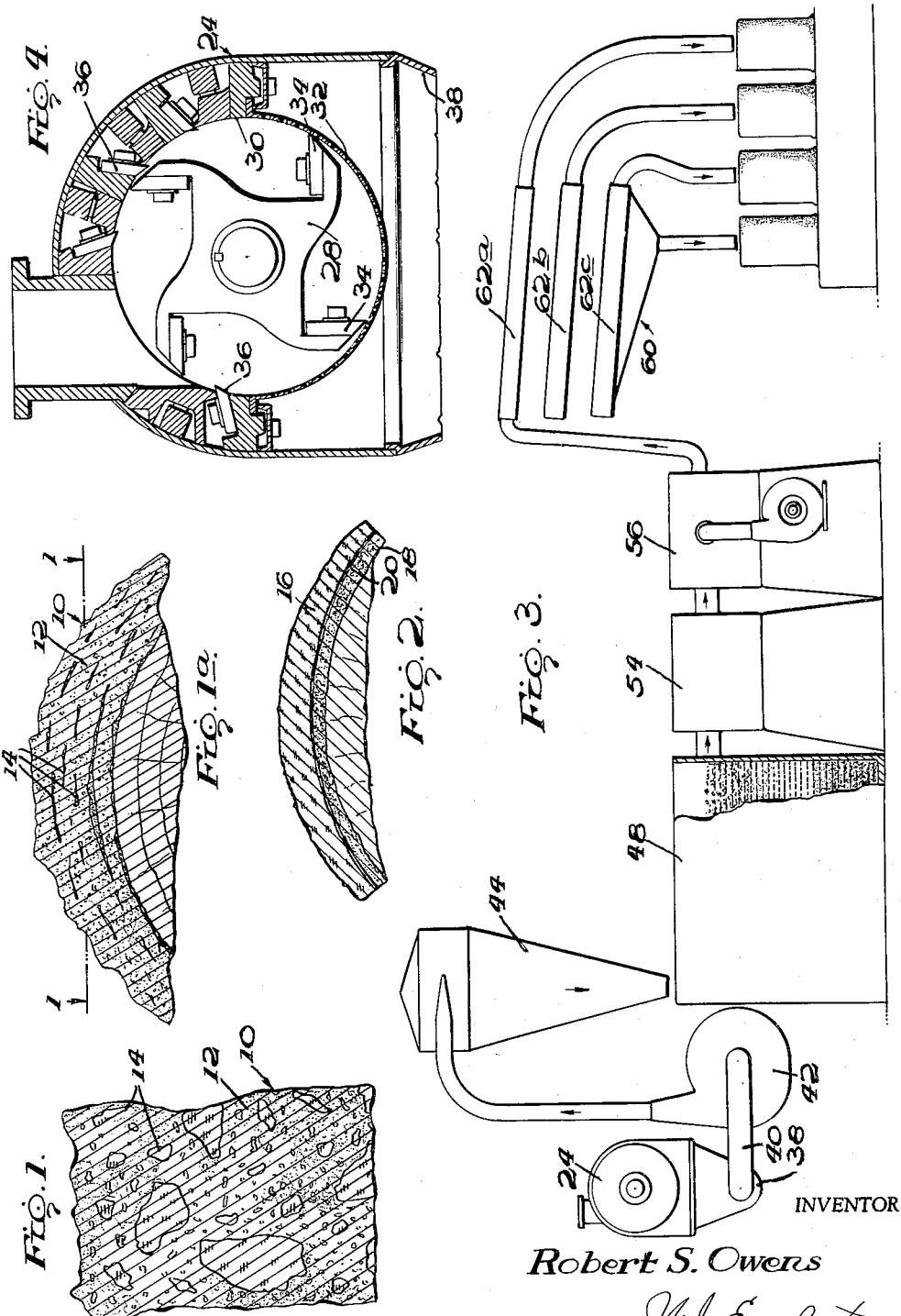

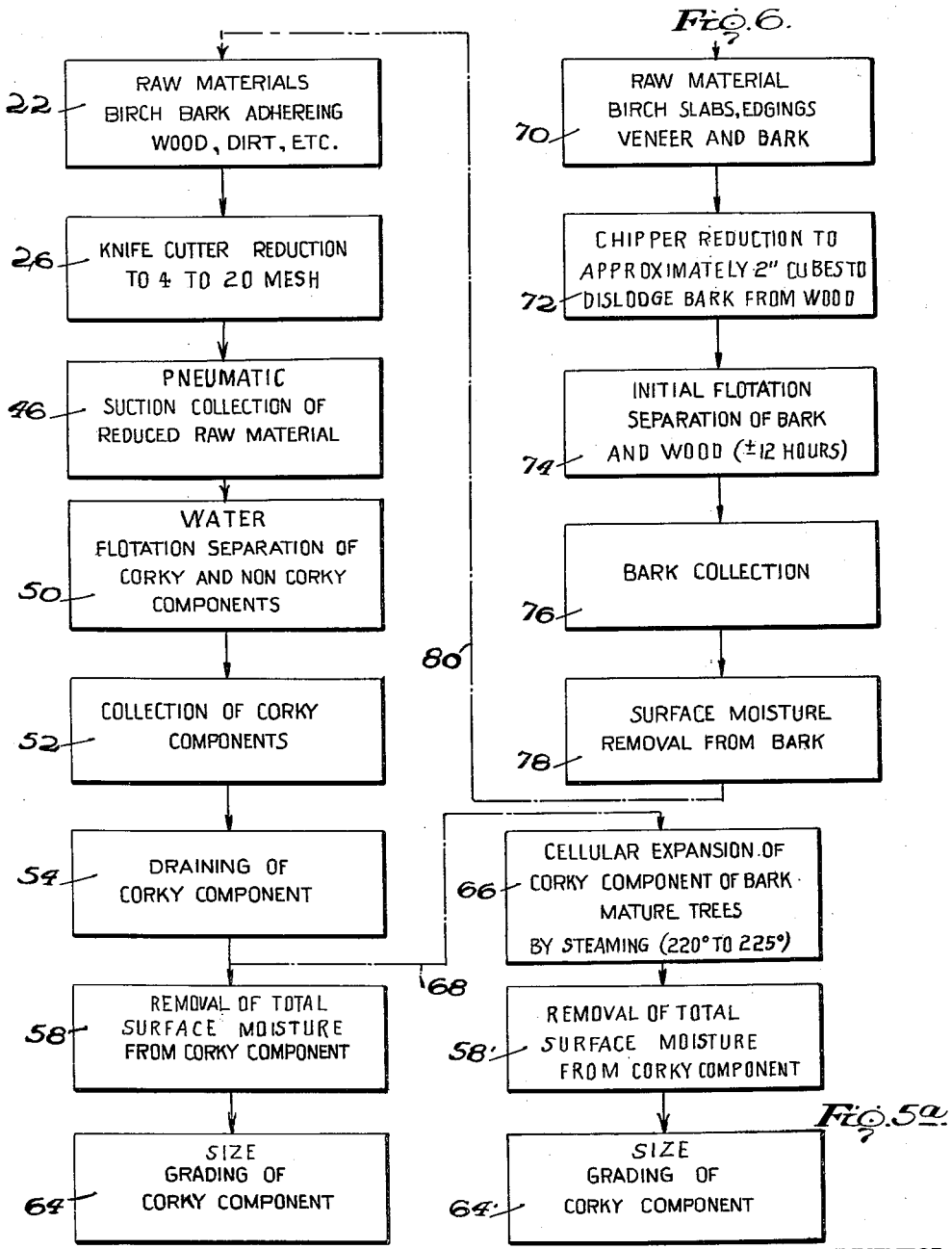

2,973,152

METHOD OF RECOVERING CORK-LIKE MATERIAL FROM BIRCH TREE BARK

Robert Stuart Owens, 602 Cabell Ave., Charlottesville, Va.

Filed July 24, 1958, Ser. No. 750,648

11 Claims. (Cl. 241—28)

The present invention relates generally to a method of obtaining a cork substitute from certain waste products of lumbering operations and more particularly to a commercially feasible method of treating birch bark to obtain a comminuted cork-like material therefrom which may be used as a substitute for comminuted cork made from the bark of the cork oak.

A number of trees in addition to the cork oak contain cork or cork-like material in the bark thereof. This has led to attempts heretofore to recover these materials from the barks of these different trees because bark normally is a waste product of lumbering and milling operations and, therefore, an inexpensive raw material, and the price of cork obtained from the cork oak makes the use of substitutes a desirable objective from an economic standpoint. However, a method of recovering this material from the bark of one type of tree normally cannot successfully be practiced on the bark of another because of differences in the barks of different trees, such as differences in the percentage of cork-like material in the bark, differences in the distribution thereof in the bark, differences in the form or shape in which it is found in the bark and differences in the manner in which it is united with the other constituents of the bark.

Among the trees having a corky component large enough to have warranted attempts in the past to recover the same are the Douglas fir and related trees. The bark of the Douglas fir is a relatively thick layer consisting of a corky component comprising a large number of particles or flakes of varying area and thickness and non-corky components comprising a mixture of fibrous materials and a granular-like pulverizable material forming a matrix in which the corky component of the bark and the fibrous materials are imbedded. Because of the firm adherence between the corky component of the Douglas fir bark and the pulverizable non-corky component of this bark, the latter must be reduced or pulverized to a powdery form completely to loosen all of the non-corky component from adherence to the corky component of the bark so that corky flakes or particles substantially completely free of adhering non-corky material may be obtained. In the known methods for producing the required pulverization of the non-corky components of fir bark to loosen the same from adherence to the corky flakes or particles, the bark is subjected to extended hammering, striking, or pounding in hammer, rod, or ball mills, all of which by the nature of their action on the bark, are bound to have an impacting effect on the corky component of the bark.

Attempts have been made heretofore to increase the brittleness of the bark by reducing the natural moisture content thereof appreciably during the reducing operation in the expectation that less pounding or hammering would be required to pulverize the non-corky components of the bark when the latter is dry. These attempts have had limited success because the reduction in moisture content seems to have little effect in loosening the layer of non-corky material directly adhered to the corky component and thus does not lessen the pounding needed to obtain a clean separation and because a reduction in the moisture content of fir bark dries the corky component thereof as well as the non-corky components, reducing the flexibility of the corky component and thus making it more readily subject to impaction. Thus, whether or not the moisture content is reduced, a large portion of those gaseous fluid filled cells present in the corky material in the bark are crushed and deflated or impacted. As a result, those properties of the corky component of the bark of the Douglas fir which are dependent on this cellular structure, such as resilience, buoyancy, low density and imperviousness to water and in which respects it resembles the bark of the cork oak are largely destroyed in the material separated from the bark of fir or related trees by the prior art methods.

Birch bark, in contrast to Douglas fir bark, comprises distinct and homogeneous layers including inner and intermediate non-corky layers and an outer layer comprised substantially entirely of a cork-like material. I have discovered that the bond between this outer cork-like layer of birch bark and the non-corky components of the bark may be broken or disrupted by shearing the bark into particles of relatively small size while it is somewhat flexed. Since the non-corky components are relatively non-flexible, the non-corky portions of the bark shatter into relatively small pieces during shearing under the above-mentioned conditions so that the non-corky components splinter or break away from the more resilient corky component which tends to flex during shearing. As a result, the corky and non-corky components of the bark are freed of adherence to each other while the bark is being reduced and the non-corky components of the bark are reduced to smaller size than the corky component so as to facilitate separation of the two components by water flotation.

Accordingly, an object of the invention is to provide a new and greatly simplified method of recovering a cork substitute from the waste bark resulting from lumbering and milling operations.

Another object of the invention is to provide a new and improved method for recovering a cork substitute from the bark of birch trees.

A further object of the invention is to provide a new and improved method of recovering a cork substitute from the bark of birch trees which minimizes crushing or other damage to the gaseous fluid filled cellular structure of the cork substitute so that the material retains to a high degree properties of cork from the cork oak such as bouyance, resilience, low density and imperviousness to water.

A still further object of the invention is to provide a new and improved method for recovering a cork substitute from birch bark which may be practiced on the bark regardless of the state of moisture content thereof.

Still another object of the invention is to provide a new and improved method for recovering a cork substitute from birch bark which by slight modification may be practiced on the bark of trees of all ages.

Another object of the invention is to provide a new and improved method for recovering a cork substitute from a raw material including birch veneer, edgings, and slabs.

A more general object of the invention is to provide a new and improved method for recovering a cork substitute from birch bark which is suitable for use in making the stock from which gaskets, bottle caps, sealing discs, insulating material, floor tile and similar items may be fabricated.

These and other objects, advantages, and capabilities of the invention will be apparent from the following description wherein reference is had to the accompanying drawings in which:

Fig. 1 is a more or less diagrammatic sectional view in a vertical plane of a piece of Douglas fir bark taken on the plane of the line 1—1 on Fig. 1a;

Fig. 1a is a fragmentary diametrical sectional view of a Douglas fir log;

Fig. 2 is a fragmentary diametrical sectional view of a birch log;

Fig. 3 is a diagrammatic elevation of one form of apparatus suitable for practicing the improved method of the present invention;

Fig. 4 is a diametrical sectional view through a fragment of a knife-cutter which may be used in the practice of the improved method of the present invention;

Fig. 5 is a block diagram showing the sequence of steps in the improved method of the present invention;

Fig. 5a is a block diagram showing a slight modification of the sequence of steps shown in Fig. 5; and Fig. 6 is a block diagram showing another modification of the sequence of steps shown in Fig. 5.

The present application is a continuation-in-part of my copending application for patent, Serial No. 569,111 for a Method of Recovering Cork-like Material from Birch Tree Bark, filed March 2, 1956, now abandoned.

It is known that the bark of many trees in addition to the cork oak contain a corky fraction or component along with non-corky fractions or components, the percentage of the corky component in the bark and its distribution therein varying with the different trees. Because bark is usually considered a waste product of lumbering and milling operations and the bark of the cork oak must be imported, and, therefore, is relatively expensive, attempts have been made in the past to recover the corky fraction in the bark of these other trees. The Douglas fir is an example of a tree having a bark with a corky component sufficient to warrant attempts to recover the same. As indicated in Figs. 1 and 1a, the Douglas fir has a relatively thick layer of bark 10 of non-homogeneous character. This bark includes a non-corky component 12 and a corky component 14 comprising a relatively large number of individual pieces that vary in area and thickness from small flake-like particles to laminae of varying area and thickness, although they usually are relatively small in area and thin.

The non-corky portion 12 of the bark comprises a fibrous material and a material which may be considered to be of granular character because it is susceptible to being pulverized to a powdered form under the conditions prescribed hereinafter. In Douglas fir bark in its natural state, the granules of this granular non-corky component 12 are very firmly adhered to each other and to the flakes and laminae 14 of the corky material. The latter are randomly distributed and imbedded in the granular non-corky component as indicated more or less diagrammatically in Figs. 1 and 1a so that it forms a matrix for the corky flakes and laminae tightly and firmly encrusting the same.

Various methods have been suggested by the prior art for separating and recovering the various fractions of the Douglas fir bark including the corky component 14. In all of the known methods, hammer mills, rod mills, or ball mills are recommended for pulverizing the granular non-corky component 12 of the bark and separating it from adherence to the corky flakes and laminae 14.

Because of the tight adherence of the granular non-corky component to the corky component, the hammering, pounding, or striking to which the bark is subjected in these devices is the only method so far discovered for successfully knocking the granular material loose from the corky flakes and laminae. However, this action must be continued for a considerable period of time and the natural moisture content of the Douglas fir bark must first be reduced considerably to obtain a clean separation of the granular non-corky components from the corky flakes and laminae.

Obviously, the pounding, hammering, or striking to which the raw material must be subjected in practicing these prior art methods is bound to crush and thus deflate and impact a large portion of such gaseous fluid filled cells as are naturally present in the corky particles or laminae imbedded in the granular non-corky component of the bark. This impaction tends to increase the density of this corky component by deflating the cells thus making it less buoyant. It also reduces or destroys other properties of this component which impart to it the characteristics of cork obtained from the bark of cork oak, such as resilience, low density and water imperviousness.

The method of the present invention which is particularly adapted for separating the corky component of birch bark from the non-corky components thereof not only eliminates or greatly minimizes the above-mentioned disadvantages of the prior art methods but also allows certain steps of these methods to be entirely eliminated. Referring to Fig. 2, it will be noted that birch bark in contrast to the bark of the Douglas fir normally comprises distinct layers, each of which is homogeneous in composition, including a homogeneous outer layer 16 and a homogeneous inner layer 18 connected by an intermediate cambium layer 20. In a growing tree, the cells of this cambium layer subdivide to form inner and outer bark cells so that this layer thus forms a bond between the inner and outer layers which is relatively easily disrupted because it is only one or two cells thick. In composition, the cambium layer 20 is partially of fibrous nature, and it water logs relatively quickly. The inner layer of bark 18 is relatively brittle and non-resilient even when green and it water logs even more readily than the cambium layer. These two layers comprise the non-corky components of the bark. The outer layer 16, which is homogeneous throughout, comprises the corky component of birch bark. Like the bark of the cork oak, it is of low density, compressible and flexible, relatively resilient, and it consists of a series of cells filled with air or other gaseous fluid. These cells are water proof and proof against many chemicals by virtue of the relatively large suberin and other resinous material contained in the walls thereof so that this component of birch bark will float on water indefinitely. Because the cells are filled with air or other gases, the insulating properties of this component which make it useful in both thermal and sound-insulating materials are enhanced.

In lumbering and milling operations, this bark, which is considered a waste or by-product of these operations, is separated from the logs in one of several ways as by the process known as "sap pealing" or by mechanical or hydraulic means, all of which are well known. Raw material thus obtained comprises the united-together inner, intermediate, and outer layers of bark and relatively small quantities of wood which may adhere to the bark. In addition, the bark of other trees growing in the same stand with the birch and bits of birch wood or other woods may become mixed with the birch bark to a greater or lesser extent.

This raw material, which is indicated at 22 in the block diagram, Fig. 5, is fed to a knife-cutter 24 (Figs. 3 and 4) designed to shear the raw material to particles of 4 mesh size or smaller as indicated at 26 in Fig. 5, it being assumed that the raw material is in pieces small enough to be received by the cutter or has first been chopped or broken to that size. A suitable knife-cutter for reducing the raw material is the Robinson No. 1212 cutter made by Robinson Manufacturing Company, Muncy, Pennsylvania, and shown in Catalog No. 47 of that organization and covered by United States Patent No. 2,216,612. This knife-cutter has a motor driven rotor 28 (Fig. 4) rotatable in a horizontally disposed cylindrical cage 30 the bottom portion of which comprises a grid 32 having a mesh of predetermined size which may approximate one-quarter inch round in the present example. The raw material fed to the cutter 24 enters the cage 30 and is retained therein by the grid 32 until it has been reduced sufficiently to pass through the openings in the grid. This reduction is effected by a series of knives 34 on the rotor 28 which cooperate with a like number of knives 36 fixed in the cage 30, the knives being adjustable to obtain the desired shearing action. The cage 30 in the above-suggested knife-cutter is approximately 1 foot in diameter and two feet long and has four knives adjustably secured in the walls thereof which cooperate with four knives on the rotor.

Below the cage 30 is a hopper 38 for receiving the reduced raw material passing through the grid 32. This hopper is connected by a conduit 40 to the inlet side of a motor-driven suction blower 42 which operates constantly throughout a reducing operation. As a result, suction is applied to the confined space defined by the cage 30 through the grid 32 throughout a reducing operation. This suction should be sufficient to draw the raw material through the grid 32 and out of the cage 30 as fast as the corky component thereof is reduced to a size approximating the mesh size of the grid. A Robinson pneumatic system of the type shown in the above-identified catalog may be used for this purpose.

It has been found that when birch bark is reduced in the apparatus above-described with the rotor operating at 480 r.p.m. and using a grid 32 having a mesh of one-quarter inch round that the corky and non-corky components of the bark are freed of attachment to each other so that the raw material is reduced to discrete particles of corky material and to other discrete particles of non-corky material or of wood, the non-corky particles and the wood particles being generally more finely reduced than the corky particles. This disruption of the union between the two components apparently arises from the difference in resilience, elasticity, or compressibility of the corky and non-corky components. Due to the relatively small size to which reduction proceeds, the non-corky components and wood apparently shatter or splinter while they are being sheared but the more resilient or flexible corky component flexes at the same time to an extent well within the elastic limit thereof. This appears to cause disruptive forces to be generated between the two components sufficient to break or splinter the non-corky components away from the corky component and to reduce these non-corky components and the wood to particles of smaller size than the corky components. As a matter of fact, in using the apparatus above-described, it was found that most of the non-corky components and wood are reduced sufficiently to pass through a 20 mesh screen, while the corky component was being reduced to a size small enough to pass through a ¼ inch round screen, and that less than 10% of the corky component was reduced to less than 20 mesh size during this process. The above explanation describes what appears to happen in the knife-cutter, and from much experiment with this cutter it was found that the corky and non-corky components of bark subjected to the action of a cutter of this type were free of attachment to each other by the time the corky component thereof was reduced sufficiently to pass through the grid 32 and that there was a differential reduction of these components as above described.

The reduced raw material drawn from the hopper 38 (Fig. 3) by the blower 42 is fed by the latter into a collector 44 which may have the usual dust filter (not shown). These steps are indicated by block 46 in Fig. 5. From the collector 44, the mixture of discrete corky and non-corky particles is fed into a water flotation chamber 48 (Fig. 3) which may be of conventional construction and may include conventional equipment (not shown) for separately removing material floating on the water in the chamber and that which may have sunk to the bottom of the chamber. Because most of the cellular structure of the corky particles produced in the reducing operation above-described remain intact and these cells are water-proofed by the suberin in the walls thereof, as previously explained, these particles will float indefinitely due to the fact that the gas filled cells have not been deflated and, consequently, are of lower specific gravity than water. However, the more finely divided particles of the non-corky components and wood waterlog relatively rapidly and sink to the bottom of the flotation chamber 48. Other non-corky materials such as sand, dust and resinous encrustations will also sink to the bottom of the chamber immediately because of their high density. This flotation separation is indicated by the block 50 in block diagram Fig. 5.

After the floating corky particles have been collected from the flotation chamber 48 as indicated by the block 52 in Fig. 5 and the excess water drained therefrom in a simple drainage chamber 54 (Figs. 3 and 5), they may be fed to a conventional air dryer 56 for the purpose of removing from the same the surface moisture picked up during flotation and not drained off in the draining chamber as indicated by block 58 in Fig. 5. No more drying time than is necessary to remove surface moisture should be permitted to avoid volatilization or other extraction from the corky particles of the suberin and other resinous materials present therein. In some cases, this drying step may not be necessary as, for example, when the ultimate use to which the material is to be put does not require that it be graded as described below or the material is to be molded into an end item using a water-soluble adhesive.

The corky fraction after being dried as above described is fed to suitable size classifying or grading equipment shown diagrammatically at 60 in Fig. 3 for separating the same into several grades in accordance with variations in the particle size where the ultimate use to be made of the corky particulate material makes this desirable. Suitable equipment for this purpose are the gyro-sifters made by the previously-mentioned Robinson Manufacturing Company and illustrated and described in their Catalog No. 41F. These sifters include slightly inclined sieve boxes shown diagrammatically at 62a, 62b and 62c in Fig. 3 to which gyratory and reciprocatory motion is imparted by a suitable motor drive (not shown). The sieve boxes 62a, b, c have grids or screens of graduated mesh size to retain particles of graduated size and thereby effect a classification or grading of the corky particles produced in the reducing operation into any desired number of grades depending on the use to which the material is to be put. This grading step is indicated by the box 64 in Fig. 5.

Experiment has shown that the described process produces a product, i.e., a particulate corky material of approximately 96% purity, the impurities comprising mainly particles of the cambium layer of bark. One example of the use to which a fraction of this corky material of intermediate size may be put is described in my Patent No. 2,549,849. This is cited merely as an example of one use of the product of the present invention. Since it may be used as a substitute for ground cork obtained from the cork oak, it will be understood that the product of the present process may be used for the many other purposes for which ground cork may be used.

By experiment it has been found that the corky outer layer of bark of the more mature birch trees may be somewhat compressed in its natural state. This compression apparently is due to a differential expansion or growth of the trunks and outer layer of bark as growth of a birch tree continues. As a result, the corky layer of bark of these mature trees is more dense and less resilient or flexible in its natural state than the corky outer layer of bark in younger trees and thus less desirable in its natural state for use as a cork substitute where resilience and compressibility are important. It has been found that the stress set up by the compressed condition of this bark may be relieved to a large extent by steaming the same, the interval of steaming varying with the age of the bark. The steaming preferably is carried out at relatively low temperature, for example, 220° to 225° F. and at a low pressure such as 3 or 4 pounds so that the suberin and other resinous materials in the bark are not leached out of the same or carried away by volatilization during the process. If steaming is required, it preferably is performed after the reduced raw material has been separated by water flotation into non-corky and corky particulate components and only the corky component then is steamed for economical reasons. Where the steaming is performed on large bulks of the material as is usually the case, it may be continued for up to twelve hours, the length of the steaming interval depending upon the age of the bark and the degree to which it is desired to relieve the stress in the bark.

This has been indicated in the block diagram Fig. 5a in conjunction with block diagram Fig. 5 from which it will be seen that the bark from mature birch trees is given the same treatment as the bark of younger trees through the point at which the particulate corky component of the bark has been separated from the particulate non-corky components by water flotation and the excess water drained from the particulate corky component as indicated in block diagram 54 (Fig. 5).

Following the latter step, the material is subjected to the low pressure, low temperature steaming above described as indicated by block 66 in Fig. 5a. The fact that the step is to follow draining of the particulate corky components is indicated by the broken line 68 connecting the output side of block 54 (Fig. 5) to the input side of block 66 in Fig. 5a. After steaming, the steamed particulate corky component is subjected to the same treatment above-described as the non-steamed particulate corky component as indicated by blocks 58' and 64' in Fig. 5a which cover the same steps as blocks 58 and 64 respectively in Fig. 5.

Since much bark may be present on birch slabs, edgings, and veneer, these waste products may also be used as a source of raw material. For example, the slabs and edgings may have about 13 to 15% by weight of outer bark and veneer trimming by about 10% by weight, both percentages being of air-dried material. As such material dries out, the inner and outer bark tend to separate as single composite layer from the wood. Normally, however, this separation is effected by processing the slabs, edgings, or veneer as indicated in the block diagram Fig. 6, the raw material being indicated by a block 70 in this view. This raw material is fed to a hogging or chipping machine as indicated by block 72 in Fig. 6 for gradually reducing the size thereof. By the time it has been reduced to pieces of approximately 2 cubic inches in size, it will be found that almost all of the inner and outer bark has been freed of adherence to the wood and at least a partial separation of the inner and outer bark has occurred. A commercially available mechanism suitable for carrying out this step is an M & M hog, which is made by Mitts & Merrill, Saginaw, Michigan, but, of course, other equivalent mechanism may be used for this purpose.

A mixture of bark and other pieces produced by the hogging machine is fed to a conventional water flotation chamber as indicated by the block 74 in the block diagram, Fig. 6, to separate the wood from the bark. Since birch wood has a high specific gravity, it will sink in a relatively short time along with such pieces of inner bark as have been freed from the outer bark. On the other hand, most of those pieces of bark which include both the inner and outer layers of bark and any pieces of the outer bark which are freed of attachment to the inner bark will float indefinitely, and all of this floating material may be separately removed by any suitable conventional collecting equipment.

Normally, approximately an 80% separation of the wood and bark pieces will have occurred in the flotation chamber within the first twelve hours of flotation, but more time may be required where a large amount of wood is present. The floating fraction which constitutes 10 to 20% of the raw material fed to the hogging machine is separately collected and removed from the flotation chamber as indicated by the block 76 in the block diagram Fig. 6. The fraction thus collected which consists primarily of bark is surface dried as indicated by block 78 in Fig. 6 by means of any conventional drying equipment suitable for removing from the surface of the bark such moisture as it picked up during the process of flotation separation. The dry bark and wood adhering thereto or mixed therewith constitutes a raw material which may thereafter be processed as indicated in Fig. 5 to recover the corky component thereof. This fact has been indicated in the drawing by showing a broken line 80 connecting the output side of block 78 in Fig. 6 to the input side of block 22 in Fig. 5.

It is to be understood that reference to specific apparatus in the foregoing specification is not intended to limit the practice of the method to the specific apparatus disclosed therein. From the foregoing, it will also be understood that the deleterious effects of the prior art methods on the corky component of fir bark would be even more pronounced if these methods were practiced on birch bark. This arises from the fact that the corky component of birch bark is a single exposed outer layer, whereas the corky flakes or particles of fir bark are encrusted or imbedded in the non-corky components. The corky component of birch bark thus is without the protection against impaction afforded to the corky flakes and particles of fir bark by the encrusting non-corky component of the fir bark, at least in the early stages of pulverization of the fir bark. It would seem, therefore, that the deleterious effects of the prior art methods would be more pronounced on the corky component of birch bark than on the like component of fir bark.

Although the method herein disclosed and claimed is particularly adapted for obtaining a cork substitute from the bark of the paper birch tree, it may be used to recover cork-like material from the bark of other species of birch or from other kinds of trees. Whether or not a particular bark shall be used as a raw material is primarily an economic question. If the cork content of the particular bark is low or its distribution in or combination with the other components of the bark would make the extraction thereof difficult, then the cost of extracting this material from the bark probably would prevent it from being competitive with cork. It is this cost factor and the quantity of bark available which primarily will determine which bark shall be used as sources of cork substitutes.

While preferred embodiments of the invention have been shown and described, it will be apparent that variations and modifications thereof may be made without departing from the underlying principles of the invention. It is desired, therefore, by the following claims, to include within the scope of the invention, all such variations and modifications by which substantially the results of the invention may be obtained through the use of substantially the same or equivalent means.

I claim:

1. The method of treating a raw material including birch bark and any wood adhering thereto or mixed therewith to separate the resilient non-water-absorptive corky component of the bark from the relatively brittle wood and water-absorptive non-corky components which comprises reducing said raw material in the state of moisture content naturally present therein by a combined flexing-shearing action effective to reduce the said corky component to particles of predetermined size without appreciably deflating the cellular structure thereof and substantially simultaneously to shatter the brittle wood and non-corky components thereof sufficiently to break the same free of the resilient corky component and into particles dimensioned to waterlog readily and of smaller size than the said particles of said corky component, removing reduced raw materials to a collecting zone substantially as fast as the several components thereof are reduced to the aforesaid sizes and separating the particulate corky component in the reduced raw material thus collected from the particulate wood and non-corky components by water flotation.

2. The method of separating a corky component from birch bark as defined in claim 1 wherein the major portion of the corky component is reduced to approximately 4 mesh size and the wood and non-corky components are substantially simultaneously reduced to approximately 20 mesh size or smaller.

3. The method of treating a raw material including birch bark and any wood adhering thereto or mixed therewith to separate the resilient non-water-absorptive corky component of the bark from the relatively brittle wood and water-absorptive non-corky components which comprises feeding said raw material in the state of moisture content naturally present therein to a knife-cutter which reduces the same by a shearing-flexing action to minimize deflation of the gaseous fluid filled cells in the corky component thereof, continuing reduction of the said raw material in said knife-cutter at the same moisture content until the said corky component is reduced to particles of predetermined size and the brittle wood and non-corky components shatter sufficiently to break free of the resilient corky component into particles dimensioned to waterlog readily and of smaller size than said corky particles by virtue of the shattering, removing reduced raw material to a collecting zone by suction substantially as fast as the wood and non-corky components are reduced to the aforesaid size and the corky component is reduced to the predetermined size and separating the particulate corky component in the reduced raw material thus collected from the particulate wood and non-corky components by water flotation.

4. The method of treating a raw material including birch bark and any wood adhering thereto or mixed therewith to separate the resilient non-water-absorptive corky component of the bark from the relatively brittle wood and water-absorptive non-corky components which comprises shearing said raw material in the state of moisture content naturally present therein, flexing said raw material substantially at the time and at the area of shearing thereof within a range not exceeding the elastic limit of said corky component to minimize deflation of the gaseous fluid filled cells of the said component as reduction proceeds to the point at which the said corky component is reduced to particles of predetermined size but exceeding the elastic limit of the brittle wood and non-corky components so that the said wood and non-corky components are shattered by the shearing thereof sufficiently to generate disruptive forces large enough to break the said wood and non-corky components free of the said resilient corky component and to reduce the said wood and non-corky components to particles dimensioned to waterlog readily and of smaller size than the said particles of said corky component, removing reduced raw material to a collecting zone substantially as fast as the several components thereof are reduced to the aforesaid sizes and separating the particulate corky component in the reduced raw material thus collected from the particulate wood and non-corky components by water flotation.

5. The method of treating a raw material including birch bark and any wood adhering thereto or mixed therewith to separate the resilient non-water-absorptive corky component of the bark from the relatively brittle wood and water-absorptive non-corky components which comprises feeding said raw material in the state of moisture content naturally present therein to a confined zone defined at least in part by a grid of predetermined mesh size, reducing said raw material in said confined zone to particles of a size approximating said mesh size by a combined flexing-shearing action effective to minimize deflation of the cellular structure of the corky component as reduction proceeds and to break the bond between the corky and non-corky components of the bark thereby freeing the said components from each other so that a mixture of particles of wood and particles of the corky component and of the non-corky components of the bark is produced in said reduction, applying suction to said confined zone through said grid throughout a reducing operation of sufficient magnitude to draw reduced raw material through said grid as fast as it is reduced to approximately the said mesh size and to remove the same to a predetermined collecting zone and separating the particulate corky component in the reduced raw material thus collected from the particulate wood and non-corky components by water flotation.

6. The method of treating a raw material including birch bark and any wood adhering thereto or mixed therewith to separate the resilient non-water-absorptive corky component of the bark from the wood and relatively brittle water-absorptive non-corky components which comprises reducing said raw material in the state of moisture content naturally present therein to particles of relatively small size by a combined flexing-shearing action effective to minimize deflation of the cellular structure of the corky component as reduction proceeds and to shatter the brittle wood and non-corky components sufficiently to break the same away from the resilient non-shatterable corky component thereby freeing the said components from each other so that a mixture of particles of wood and particles of the corky component and of the non-corky components of the bark is produced in said reduction, removing reduced raw material to a collecting zone substantially as fast as it is reduced to particles of the said relatively small size, separating the particulate corky component in the reduced raw material thus collected from the particulate wood and non-corky components by water flotation and separately collecting the floating particulate corky component and the submerged particulate wood and non-corky components.

7. The method of treating a raw material including birch bark and any wood adhering thereto or mixed therewith to separate the resilient non-water-absorptive corky component of the bark from the wood and relatively brittle water-absorptive non-corky components which comprises reducing said raw material in the state of moisture content naturally present therein to particles of relatively small size by a combined flexing-shearing action effective to minimize deflation of the cellular structure of the corky component as reduction proceeds and to shatter the brittle wood and non-corky components sufficiently to break the same away from the resilient non-shatterable corky component thereby freeing the said components from each other so that a mixture of particles of wood and particles of the corky component and of the non-corky components of the bark is produced in said reduction, removing reduced raw material to a collecting zone substantially as fast as it is reduced to particles of the said relatively small size, separating the particulate corky component in the reduced raw material thus collected from the particulate wood and non-corky components by water flotation, separately collecting the floating corky component and subjecting the corky component thus collected to air-drying for an interval of time sufficient to remove surface moisture only from the same.

8. The method of treating a raw material including birch bark and any wood adhering thereto or mixed therewith to separate the resilient non-water-absorptive corky component of the bark from the wood and relatively brittle water-absorptive non-corky components which comprises reducing said raw material in the state of moisture content naturally present therein to particles of relatively small size by a combined flexing-shearing action effective to minimize deflation of the cellular structure of the corky component as reduction proceeds and to shatter the brittle wood and non-corky components sufficiently to break the same away from the resilient non-shatterable corky component thereby freeing the said components from each other so that a mixture of particles of wood and particles of the corky component and of the non-corky components of the bark is produced in said reduction, removing reduced raw material to a collecting zone substantially as fast as it is reduced to particles of the said relatively small size, separating the particulate corky component in the reduced raw material thus collected from the particulate wood and non-corky components by water flotation, separately collecting the floating corky component, subjecting the corky component thus collected to air-drying for an interval of time sufficient to remove surface moisture only from the same and separating said reduced dry corky component into a plurality of grades according to particle size.

9. The method of treating a raw material including birch bark and any wood adhering thereto or mixed therewith to separate the resilient non-water-absorptive corky component of the bark from the wood and relatively brittle water-absorptive non-corky components which comprises reducing said raw material in the state of moisture content naturally present therein to particles of relatively small size by a combined flexing-shearing action effective to minimize deflation of the cellular structure of the corky component as reduction proceeds and to shatter the brittle wood and non-corky components sufficiently to break the same away from the resilient non-shatterable corky component thereby freeing the said components from each other so that a mixture of particles of wood and particles of the corky component and of the non-corky components of the bark is produced in said reduction, removing reduced raw material to a collecting zone substantially as fast as it is reduced to particles of the said relatively small size, separating the particulate corky component in the reduced raw material thus collected from the particulate wood and non-corky components by water flotation, separately collecting the floating corky component, subjecting the corky component thus collected to air-drying for an interval of time sufficient to remove surface moisture only from the same and subjecting said reduced dried corky component to a differential screening to separate the same into grades according to particle size.

10. The method of treating a raw material including birch bark and any wood adhering thereto or mixed therewith to separate the resilient non-water-absorptive corky component of the bark from the wood and relatively brittle water-absorptive non-corky components which comprises reducing said raw material in the state of moisture content naturally present therein to particles of relatively small size by a combined flexing-shearing action effective to minimize deflation of the cellular structure of the corky component as reduction proceeds and to shatter the brittle wood and non-corky components sufficiently to break the same away from the resilient non-shatterable corky component thereby freeing the said components from each other so that a mixture of particles of wood and particles of the corky component and of the non-corky components of the bark is produced in said reduction, removing reduced raw material to a collecting zone substantially as fast as it is reduced to particles of the said relatively small size, separating the particulate corky component in the reduced raw material thus collected from the particulate wood and non-corky components by water flotation, separately collecting the floating corky component and the submerged non-corky components and steaming said reduced corky component at a pressure and temperature sufficiently elevated to expand the cellular structure of the particulate corky component but yet low enough to avoid extraction of the waxes and resins naturally present in said corky component.

11. The method of recovering the cork-like fraction naturally present in birch bark from waste raw materials resulting from lumbering or milling operations on birch trees including slabs, edgings and veneer having adhering bark consisting of corky and non-corky components comprising reducing said raw material by a mechanical operation effective to dislodge the bark from the wood, separating the mixture of bark and wood obtained by said reducing operation by water flotation, reducing the said bark so obtained to relatively small particles by a combined flexing and shearing operation effective to minimize crushing of the cellular structure of the said corky component as the reduction proceeds and to break the bond between the corky and non-corky components of the bark thereby freeing the said components from each other, collecting the reduced components of said bark in a single collecting zone throughout a reducing operation substantially as soon as said bark is reduced to a size at which the bond between the corky and non-corky components is broken and then separating the mixture of reduced bark components into a non-corky fraction and a corky fraction by water flotation.

References Cited in the file of this patent

UNITED STATES PATENTS

| | | |
|---|---|---|
| 556,111 | Talbot | Mar. 10, 1896 |
| 577,278 | Autenrieth | Feb. 16, 1897 |
| 689,193 | Jones | Dec. 17, 1901 |
| 979,914 | Ayer | Dec. 27, 1910 |
| 1,455,762 | Howard | May 15, 1923 |
| 1,870,166 | Bond | Aug. 2, 1932 |
| 2,149,289 | Hall | Mar. 7, 1939 |
| 2,216,612 | Dimm | Oct. 1, 1940 |
| 2,437,672 | Anway | Mar. 16, 1948 |
| 2,444,929 | Hatch | July 13, 1948 |
| 2,446,551 | Pauley | Aug. 10, 1948 |
| 2,549,849 | Owens | Apr. 24, 1951 |
| 2,596,015 | Dunwody | May 6, 1952 |
| 2,764,289 | Scheid | Sept. 25, 1956 |
| 2,825,371 | Forman | Mar. 4, 1958 |
| 2,877,953 | Heritage | Mar. 17, 1959 |